(12) United States Patent
Zhao et al.

(10) Patent No.: US 11,709,619 B2
(45) Date of Patent: Jul. 25, 2023

(54) METHOD, ELECTRONIC DEVICE, AND COMPUTER PROGRAM PRODUCT FOR PROCESSING DATA

(71) Applicant: EMC IP Holding Company LLC, Hopkinton, MA (US)

(72) Inventors: Shijie Zhao, Shanghai (CN); Colin Yuanfei Cai, Shanghai (CN); Qirong Wang, Shanghai (CN); Bei Gao, Shanghai (CN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 17/644,423

(22) Filed: Dec. 15, 2021

(65) Prior Publication Data
US 2022/0107750 A1    Apr. 7, 2022

Related U.S. Application Data

(63) Continuation of application No. 16/917,471, filed on Jun. 30, 2020, now Pat. No. 11,231,869.

(30) Foreign Application Priority Data

Apr. 30, 2020    (CN) .......................... 202010365019.1

(51) Int. Cl.
G06F 3/06    (2006.01)

(52) U.S. Cl.
CPC .......... *G06F 3/0653* (2013.01); *G06F 3/0611* (2013.01); *G06F 3/0614* (2013.01); *G06F 3/0629* (2013.01); *G06F 3/0673* (2013.01)

(58) Field of Classification Search
CPC .... G06F 3/0611; G06F 3/0653; G06F 3/0629; G06F 3/0614; G06F 3/0373
See application file for complete search history.

(56) References Cited

U.S. PATENT DOCUMENTS 10,887,199 B2    1/2021  Onoue
10,904,320 B1    1/2021  Baptist et al.
(Continued)

FOREIGN PATENT DOCUMENTS

WO    WO-2015153671 A1 * 10/2015    .............. G06F 11/00

OTHER PUBLICATIONS

IRadecki,Introduction to Large Processor Capacity and Performance Evaluation, IP.com Prior Art Database Technical Disclosure, May 1986.*

(Continued)

*Primary Examiner* — Pierre Michel Bataille
(74) *Attorney, Agent, or Firm* — Amin, Turocy & Watson, LLP

(57) ABSTRACT

A data processing method includes receiving a message related to performance of a storage device, the message including an indicator value regarding the performance in a first time period, and a timestamp associated with the first time period. A status record of the storage device, including the number of received indicator values in a second time period including the first time period, is determined based on the timestamp, wherein the number of the received indicator values is less than a threshold number and can be updated based on the indicator value. The performance in the second time period can be determined based on the indicator value and the received indicator values in response to determining that the updated number of the received indicator values reaches the threshold number. Thus, the performance of the storage device can be quickly and accurately determined, and the consumption of computing resources is reduced.

20 Claims, 5 Drawing Sheets

(56) References Cited

U.S. PATENT DOCUMENTS

| | | | |
|---|---|---|---|
| 2008/0071987 A1* | 3/2008 | Karn | G06F 12/0802 |
| | | | 711/E12.017 |
| 2008/0104248 A1 | 5/2008 | Yahiro et al. | |
| 2009/0132304 A1* | 5/2009 | Krause | G06Q 10/06 |
| | | | 705/7.39 |
| 2010/0332646 A1 | 12/2010 | Balasubramanian et al. | |
| 2012/0236729 A1 | 9/2012 | Heinz et al. | |
| 2014/0201473 A1 | 7/2014 | Falanga et al. | |
| 2016/0098229 A1* | 4/2016 | Schreiber | G06F 3/0673 |
| | | | 711/166 |
| 2018/0241658 A1 | 8/2018 | Cheng | |
| 2019/0245766 A1 | 8/2019 | Onoue | |
| 2020/0151204 A1* | 5/2020 | Fletcher | H04L 41/22 |
| 2020/0259914 A1 | 8/2020 | Dasari et al. | |
| 2021/0191648 A1 | 6/2021 | Karuppiah et al. | |

OTHER PUBLICATIONS

Non-Final Office Action received for U.S. Appl. No. 16/917,471 dated Jul. 6, 2021, 21 pages.
Notice of Allowance received for U.S. Appl. No. 16/917,471 dated Oct. 5, 2021, 17 pages.
Du et al., "Clock-SI: Snapshot Isolation for Partitioned Data Stores Using Loosely Synchronized Clocks," 2013 IEEE 32nd International Symposium on Reliable Distributed Systems, 2013, pp. 173-184.
U.S. Appl. No. 16/917,471, filed Jun. 30, 2020.

* cited by examiner

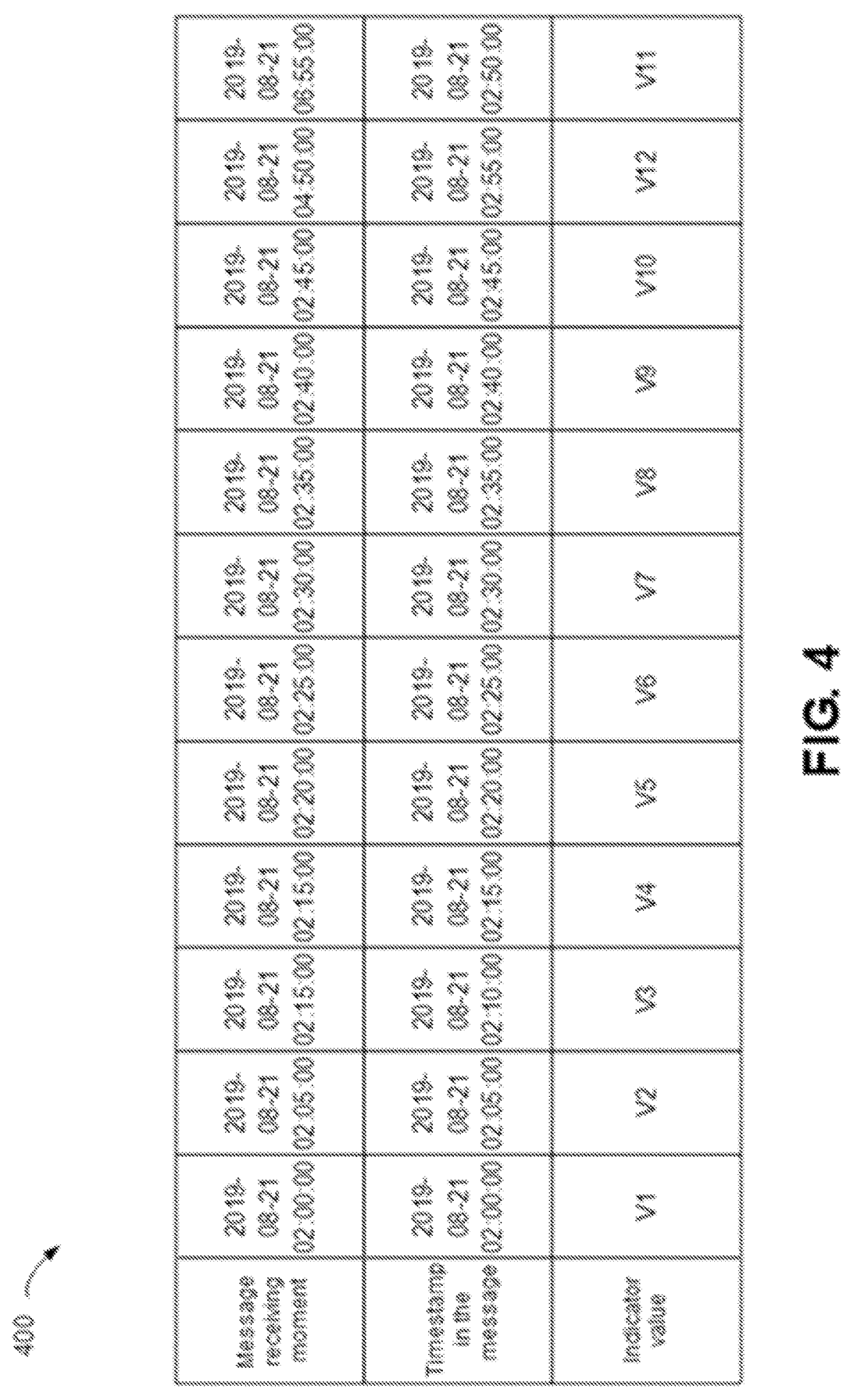

| Message receiving moment | Timestamp in the message | Indicator value |
|---|---|---|
| 2019-08-21 02:00:00 | 2019-08-21 02:00:00 | V1 |
| 2019-08-21 02:05:00 | 2019-08-21 02:05:00 | V2 |
| 2019-08-21 02:15:00 | 2019-08-21 02:10:00 | V3 |
| 2019-08-21 02:15:00 | 2019-08-21 02:15:00 | V4 |
| 2019-08-21 02:20:00 | 2019-08-21 02:20:00 | V5 |
| 2019-08-21 02:25:00 | 2019-08-21 02:25:00 | V6 |
| 2019-08-21 02:30:00 | 2019-08-21 02:30:00 | V7 |
| 2019-08-21 02:35:00 | 2019-08-21 02:35:00 | V8 |
| 2019-08-21 02:40:00 | 2019-08-21 02:40:00 | V9 |
| 2019-08-21 02:45:00 | 2019-08-21 02:45:00 | V10 |
| 2019-08-21 04:50:00 | 2019-08-21 02:55:00 | V12 |
| 2019-08-21 06:55:00 | 2019-08-21 02:50:00 | V11 |

FIG. 4

METHOD, ELECTRONIC DEVICE, AND COMPUTER PROGRAM PRODUCT FOR PROCESSING DATA

RELATED APPLICATIONS

The present application is a continuation of, and claims priority to, U.S. patent application Ser. No. 16/917,471, filed Jun. 30, 2020, and entitled "METHOD, ELECTRONIC DEVICE, AND COMPUTER PROGRAM PRODUCT FOR PROCESSING DATA," each of which applications claim priority to Chinese Patent Application No. 202010365019.1, filed on Apr. 30, 2020, which applications are hereby incorporated into the present application by reference herein in their entireties.

TECHNICAL FIELD

Embodiments of the present disclosure relate to the field of data processing, and in particular, to a method, an electronic device, and a computer program product for processing data.

BACKGROUND

With the development of computer technologies, more and more data need to be stored. Generally, users store or manage these data through dedicated storage devices or storage systems. In order to facilitate the storage and management of user data, various storage technologies are constantly being improved to achieve higher processing efficiency.

With the improvement of storage technologies, many storage systems or storage platforms begin to use these improved storage technologies, such as a cluster storage technology. These improved storage systems realize better data management. However, there are still many problems to be solved in the management of the storage systems.

SUMMARY

Embodiments of the present disclosure provide a method, an electronic device, and a computer program product for processing data.

According to a first aspect of the present disclosure, a method for processing data is provided. The method includes receiving a message related to the performance of a storage device, wherein the message includes a first indicator value regarding the performance of the storage device in a first time period, and a timestamp associated with the first time period. The method further includes determining a status record of the storage device based on the timestamp, wherein the status record includes the number of received indicator values in a second time period, the second time period includes the first time period, and the number of the received indicator values is less than a threshold number. The method further includes updating the number of the received indicator values in the status record based on the first indicator value. The method further includes determining the performance of the storage device in the second time period based on the first indicator value and the received indicator values in response to determining that the updated number of the received indicator values reaches the threshold number.

According to a second aspect of the present disclosure, an electronic device is provided. The electronic device includes a processor; and a memory, storing a computer program instruction. The processor operates the computer program instruction in the memory to control the electronic device to execute actions, and the actions include: receiving a message related to the performance of a storage device, wherein the message includes a first indicator value regarding the performance of the storage device in a first time period, and a timestamp associated with the first time period; determining a status record of the storage device based on the timestamp, wherein the status record includes the number of received indicator values in a second time period, the second time period includes the first time period, and the number of the received indicator values is less than a threshold number; updating the number of the received indicator values in the status record based on the first indicator value; and determining the performance of the storage device in the second time period based on the first indicator value and the received indicator values in response to determining that the updated number of the received indicator values reaches the threshold number.

According to a third aspect of the present disclosure, a computer program product is provided. The computer program product is tangibly stored on a nonvolatile computer-readable medium and includes a machine-executable instruction; and the machine-executable instruction, when executed, causes a machine to perform the steps of the method in the first aspect of the present disclosure.

BRIEF DESCRIPTION OF THE DRAWINGS

By describing the example embodiments of the present disclosure in more detail in conjunction with the accompanying drawings, the above and other objectives, features, and advantages of the present disclosure will become more apparent. In the example embodiments of the present disclosure, the same reference numerals generally represent the same parts.

FIG. 4 illustrates a schematic diagram of statistical table 400 of messages according to the embodiments of the present disclosure.

In the various accompanying drawings, the same or corresponding reference numerals represent the same or corresponding parts.

DETAILED DESCRIPTION

Figure 1:
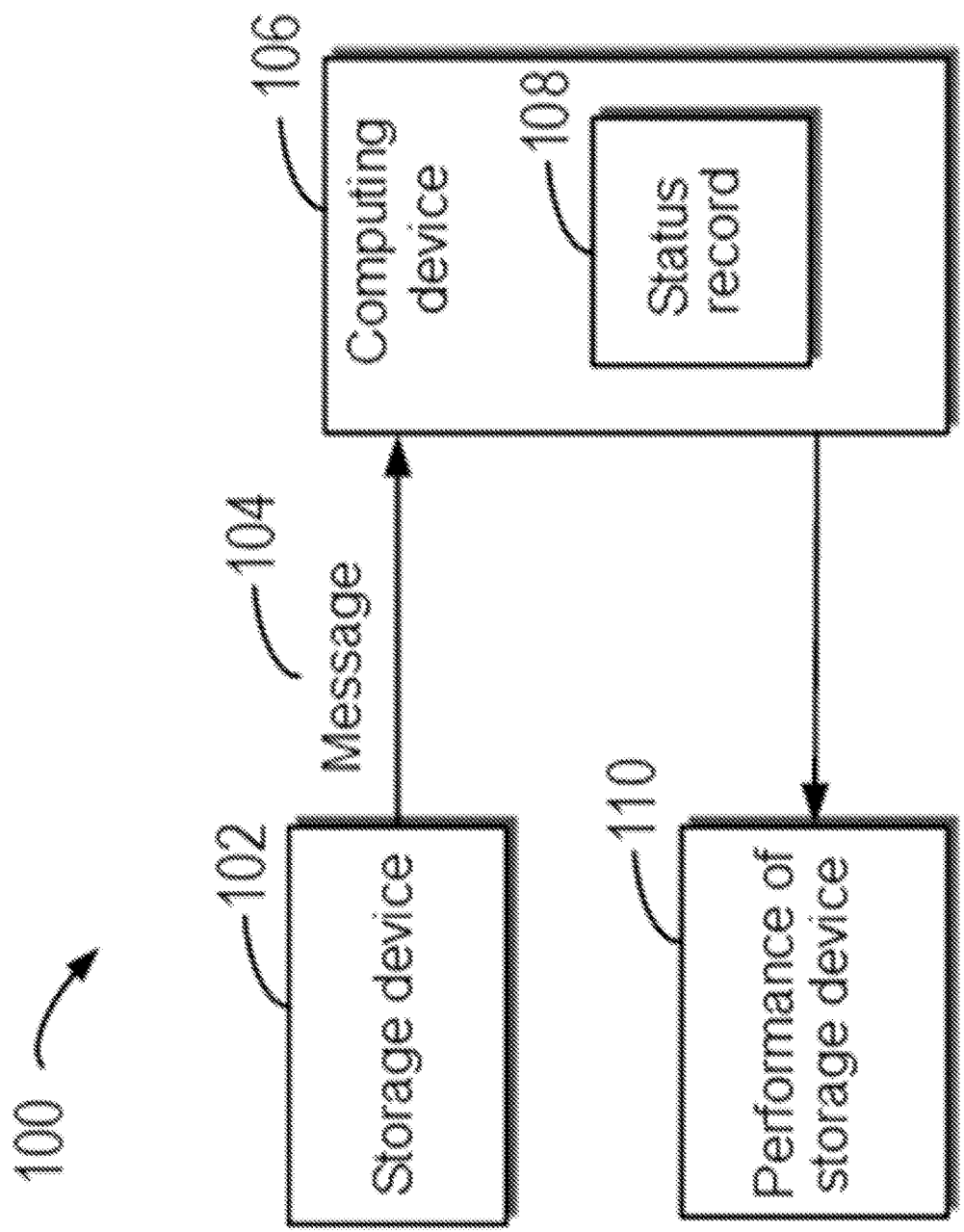
FIG. 1 illustrates a schematic diagram of example environment 100 where a device and/or a method according to the embodiments of the present disclosure may be implemented.

The following will describe the embodiments of the present disclosure in more detail with reference to the accompanying drawings. Although the drawings show certain embodiments of the present disclosure, it should be understood that the present disclosure can be implemented in various forms and should not be limited by the embodiments described herein. Instead, these embodiments are provided to enable a more thorough and complete understanding of the present disclosure. It should be understood that the drawings and embodiments of the present disclosure are only exemplary and are not intended to limit the protection scope of the present disclosure.

In the description of the embodiments of the present disclosure, the term "include" and its similar terms should be understood as open including, i.e., "including but not limited to." The term "based on" means "based at least in part on." The term "one embodiment" or "the embodiment" should be understood as "at least one embodiment." The terms "first," "second," and the like may refer to different or the same objects. Other explicit and implicit definitions may also be included below.

The following will describe the principle of the present disclosure by referring to several example embodiments illustrated in the drawings. Although the drawings show preferred embodiments of the present disclosure, it should be understood that these embodiments are described only to enable those skilled in the art to better understand and implement the present disclosure, and do not limit the scope of the present disclosure in any way.

In order to facilitate the management of a storage device or a storage platform, the storage system or the storage platform will send its performance in a time period of a first duration to a server, such as an indicator value of the performance in 5 min. Therefore, the server can count the performance of the storage device in a time period with a second duration, and the second duration is longer than the first duration. For example, the server may determine the performance of the storage device in 1 h based on the indicator values sent 12 times by the storage device in 1 h. In addition, the server may also use the determined performance to obtain the performance of the storage device in a longer time period.

When the performance in the time period with the second duration is determined, a conventional scheme is to recalculate the performance of the storage device in the second time period each time a message in the second time period is received. Although this scheme may be faster or more accurate, it consumes a large number of computing resources.

In order to reduce the consumption of computing resources, another conventional scheme is to calculate the performance of the storage device in the second time period only when the last message in the second time period is received. The determination of the last message is based on a timestamp included therein. For example, if the storage device sends an indicator value of the performance every 5 min, and the server determines the indicator values of the performance of the storage device for 1 h, it may be set to calculate the performance of the storage device on the basis of a message with a timestamp of *:55:00. However, sometimes due to various problems in a message transmission process, the server does not always receive the message with the timestamp of *:55:00 in time, which makes it impossible to calculate the performance of the storage system during this time period and makes it impossible to provide users with real-time information. If it is lost, it is impossible to provide users with information at all. Or, if the message with the timestamp of *:55:00 is received before receiving messages at some time points, then even if the information at other time points is received later, it can no longer be used to calculate the performance of the storage device. This makes the determined performance in the second time period inaccurate.

In order to solve the above and other potential problems, the present disclosure provides a method for processing data. In the method, a server determines a status record of a storage device based on a timestamp in a message when receiving the message related to the performance of the storage device. The status record includes the number of received indicator values in a second time period. Then, the server updates the number of the received indicator values in the status record based on a first indicator value in the message. The server determines the performance of the storage device in the second time period based on the first indicator value and the received indicator values in response to determining that the updated number of the received indicator values reaches a threshold number. Through the foregoing method, the performance of the storage device can be more quickly and accurately determined, and the consumption of computing resources is reduced.

The embodiments according to the present disclosure are described in detail below through FIGS. 1 to 5. FIG. 1 illustrates a schematic diagram of example environment 100 where a device and/or a method according to the embodiments of the present disclosure may be implemented.

As shown in FIG. 1, example environment 100 includes storage device 102. Storage device 102 is configured to store data of a user. Storage device 102 will determine the indicator value of the performance once in each time period with a first duration. In some embodiments, the first duration is 5 min, and storage device 102 determines an indicator value of its performance every 5 min. In some embodiments, the first duration is 10 min, and storage device 102 determines an indicator value of its performance every 10 min. The above examples are only for describing the present disclosure, rather than specifically limiting the present disclosure. Those skilled in the art can set the size of the first duration as required.

The performance of storage device 102 may be the processor utilization rate of storage device 102, the throughput of storage device 102, the number of operations performed by storage device 102 per second, the number of clients connected to storage device 102, or any combination thereof.

After obtaining the indicator value of its performance of each time period, storage device 102 will send it to computing device 106. In FIG. 1, storage device 102 generates message 104 to be sent to computing device 106 after obtaining the indicator value of the performance of the first time period. In some embodiments, message 104 includes an identifier and type of storage device 102, a first indicator value of the performance in a first time period, and a timestamp that determines the first indicator value. In some embodiments, the timestamp is the last moment of the first time period. One storage device 102 is illustrated in FIG. 1, which is only an example, rather than a limitation to the present disclosure, and the number of storage devices connected to computing device 106 may be set as required.

Computing device 106 determines the performance of storage device 102 by using received message 104. Computing device 106 includes, but is not limited to, a personal computer, a server computer, a handheld or laptop device, a mobile device such as a mobile phone, a Personal Digital Assistant (PDA), and a media player, a multiprocessor system, a consumer electronic product, a small computer, a mainframe computer, a distributed computing environment including any of the above systems or devices, etc.

Computing device 106 may be configured to determine the performance of storage device 102 in a second duration longer than the first duration. For example, after computing device 106 obtains the indicator value of the performance of storage device 102 in 5 min duration, it may be configured to determine the indicator values of the performance of storage device 102 in 1 h duration.

In order to facilitate the determination of the performance of storage device 102 in a second time period with a second duration, computing device 106 has a status record set regarding storage device 102, such as a status record table. The status record table in the status record set may be configured to determine the performance of the storage device in the second time period. Therefore, computing device 106 will look up corresponding status record 108 in the status record set based on received message 104.

In some embodiments, if computing device 106 has received other messages from storage device 102 in the second time period before receiving message 104, there is status record 108. Status record 108 includes an identifier of storage device 102, the first duration, a start moment and an end moment of the second time period, the number of received indicator values, and an acquisition moment at which the performance of storage device 102 in the second time period is to be acquired. The acquisition time is determined by the last moment at which the indicator value in the second time period is received plus a predetermined duration. The predetermined duration is a time interval for receiving the message related to the performance of storage device 102, and represents a maximum waiting time after receiving the indicator value at the previous time. If there is no new indicator value received after waiting for the predetermined duration since the indication value was last received, the received indicator value is used to calculate the performance of storage device 102 in the second time period without waiting for a new indicator value.

In some embodiments, the predetermined duration is greater than the first duration and less than twice the first duration. For example, when the first duration is 5 min, the predetermined duration may be 8 min. In some embodiments, the predetermined duration may be set to any suitable duration.

If there is status record 108, the number of the received indicator values in status record 108 is updated. Then, computing device 106 compares the updated number of the received indicator values with a threshold number, and the threshold number is determined by the duration of the second time period and the duration of the first time period. For example, the threshold number is determined by dividing the second duration by the first duration. For example, if the second duration is 1 h and the first duration is 5 min, the threshold number is 12.

When the number reaches the threshold number, the performance of storage device 102 in the second time period is determined by using the first indicator value and the received indicator values. Status record 108 is deleted after the performance of the second time period is determined. If the number does not reach the threshold number, the acquisition moment in status record 108 is also adjusted in addition to updating the number of the received indicator values in status record 108. For example, the acquisition moment is updated based on the moment at which the message 104 is received and the predetermined duration.

If computing device 106 does not find status record 108, it will generate status record 108 in the status record set. The number of the received indicator values in status record 108 is set to be 1, and the acquisition moment is set to be a sum of the moment at which message 104 is received and the predetermined duration.

In some embodiments, computing device 106 may also periodically describe the status record set. If the current moment has exceeded the acquisition moment in status record 108 in the status record set, the received indicator values are used to determine performance 110 of the storage device in the second time period. Then, status record 108 is deleted.

In some embodiments, computing device 106 will generate a performance record upon receiving message 104 from storage device 102, and then save the performance record in a performance record set. For example, the performance record generated by message 104 includes the identifier of storage device 102, the first duration, a timestamp, and a performance indicator value. Computing device 106 may look up an indicator value of storage device 102, which has a timestamp in the second time period from the performance information record set. Alternatively, or additionally, a corresponding performance record may also be generated based on information of the determined performance of storage device 102 in the second time period, and the performance record includes an identifier of storage device 102, the second duration, a moment at which the performance of storage device 102 in the second time period is determined, and an indicator value of the performance of storage device 102 in the second time period.

Computing device 106 may also determine the performance of storage device 102 in a third time period with a third duration based on acquired performance 110 of the storage device in the second time period. For example, the performance of one day is determined by using the determined performance of each hour. The status record of the performance of storage device 102 in one day may also exist in the status record set of computing device 106 or be stored in another status record set. A use manner for the status record of the third time period is similar to that for the status record of the second time period. The above examples are only for describing the present disclosure, rather than specifically limiting the present disclosure. Those skilled in the art can set a correspondence between different levels of durations as required.

When a user wants to acquire the performance of storage device 102 in different time periods through computing device 106, performance indicator values of different durations may be provided as information provided to the user. For example, if the user wants to check the specific performance of storage device 102 in one day, the acquired indicator value of the performance per hour may be shown to the user. If the user wants to check the indicator values of performance in one month or one year, the indicator values of the performance per day may be returned to the user.

The above describes the schematic diagram of environment 100 where the device and/or the method according to the embodiments of the present disclosure may be implemented with reference to FIG. 1. The following describes a flow chart of method 200 for processing data according to the embodiments of the present disclosure with reference to FIG. 2. Method 200 may be implemented in computing device 106 in FIG. 1 or any other suitable devices.

At block 202, computing device 106 receives message 104 related to the performance of storage device 102. Message 104 includes a first indicator value regarding the performance of storage device 102 in a first time period, and a timestamp associated with the first time period. In some embodiments, the timestamp is the last moment of the first time period. In some embodiments, the timestamp is a moment at which message 104 is generated.

In some embodiments, the first indicator value may be an average value of the performance of storage device 102 in the first period. In some embodiments, the first indicator value may be an indicator value of the performance at a certain moment in the first time period. The above examples are only for describing the present disclosure, rather than specifically limiting the present disclosure.

At block 204, computing device 106 determines status record 108 of storage device 102 based on the timestamp. Status record 108 includes the number of received indicator values in a second time period; the second time period includes the first time period, and the number of the received indicator values is less than a threshold number.

In some embodiments, computing device 106 also acquires the identifier and type of storage device 102 from message 104. Computing device 106 then determines a first duration of the first time period based on the type. In one example, computing device 106 stores the duration for performance determination of each type of storage device. Computing device 106 may also set the size of the second duration to determine the performance of storage device 102 in the second long time period. For example, if storage device 102 sends a 5-min performance indicator value, the second duration may be set to be 1 h. Therefore, computing device 106 may obtain the performance of storage device 102 in 1 h.

Computing device 106 uses the timestamp to determine a start moment and an end moment of the second time period. For example, if the second duration is 1 h and the timestamp in the received information is 2019-08-21 02:05:00, the start moment of the second time period is 2019-08-21 02:00:00 and the end moment is 2019-08-21 02:55:00.

Computing device 106 uses the identifier of storage device 102, the first duration, the start moment, and the end moment to look up a corresponding status record. If the corresponding previous status record is found, the obtained previous status record is used as the status record. In some embodiments, in response to determining that there is no previous status record in the status record set, computing device 106 needs to determine an acquisition moment for obtaining the performance of storage device 102 in the second time period. Then, computing device 106 generates status record 108 based on the acquisition moment, the identifier, the first duration, the start moment, and the end moment.

At block 206, computing device 106 updates the number of received indicator values in the status record based on the first indicator value. In some embodiments, computing device 106 progressively increases the number of indicator values in the status record. Therefore, in a newly created record, the number is 1 at this moment. If the number of the previously received indicator values is 2, the number of indicator values is adjusted to be 3.

At block 208, computing device 106 determines the performance of storage device 102 in the second time period based on the first indicator value and the received indicator values in response to determining that the updated number of the received indicator values reaches the threshold number. After computing device 106 determines that the updated number of the indicator values reaches the threshold number, computing device 106 uses all the received indicator values to calculate the indicator value of storage device 102 in the second time period.

In some embodiments, computing device 106 determines the average value of the first indicator value and the received indicator values as the performance of storage device 102 in the second time period. In some embodiments, computing device 106 determines an indicator value among the first indicator value and the received indicator values of storage device 102, which is greater than a first threshold value, as the performance of storage device 102 in the second time period. For example, the maximum value among the first indicator value and the received indicator values is determined as the performance of storage device 102 in the second time period. In some embodiments, computing device 106 determines an indicator value among the first indicator value and the received indicator values, which is less than a second threshold value, as the performance of storage device 102 in the second time period, wherein the second threshold value is less than the first threshold value. For example, the minimum value among the first indicator value and the received indicator values is determined as the performance of storage device 102 in the second time period. The above examples are only for describing the present disclosure, rather than specifically limiting the present disclosure.

In some embodiments, computing device 106 uses the moment at which message 104 is received and a predetermined duration to update the acquisition moment in status record 108, which is used to acquire the performance of storage device 102 in the second time period, in response to determining that the updated number of received indicator values is less than the threshold number.

In some embodiments, if another message from storage device 102 is received after the performance of storage device 102 in the second time period has been determined and the status record is deleted, and the timestamp of the other message is within the second time period, status record 108 is regenerated. The performance record generated by the other message is then stored in the performance record set. If it already exists, the previous performance record is replaced with a newly generated performance record.

Since the acquisition moment for acquiring the performance of storage device 102 in the second time period is set in status record 108, computing device 106 may reacquire the received indicator value in the second time period to re-determine the performance of storage device 102 in the second time period when the current moment is greater than the acquisition moment. Then, the record is deleted.

Through the method, the performance of the storage device can be quickly (e.g., near real time) and accurately determined by using the status record of the storage device, and the consumption of resources is reduced.

Figure 2:
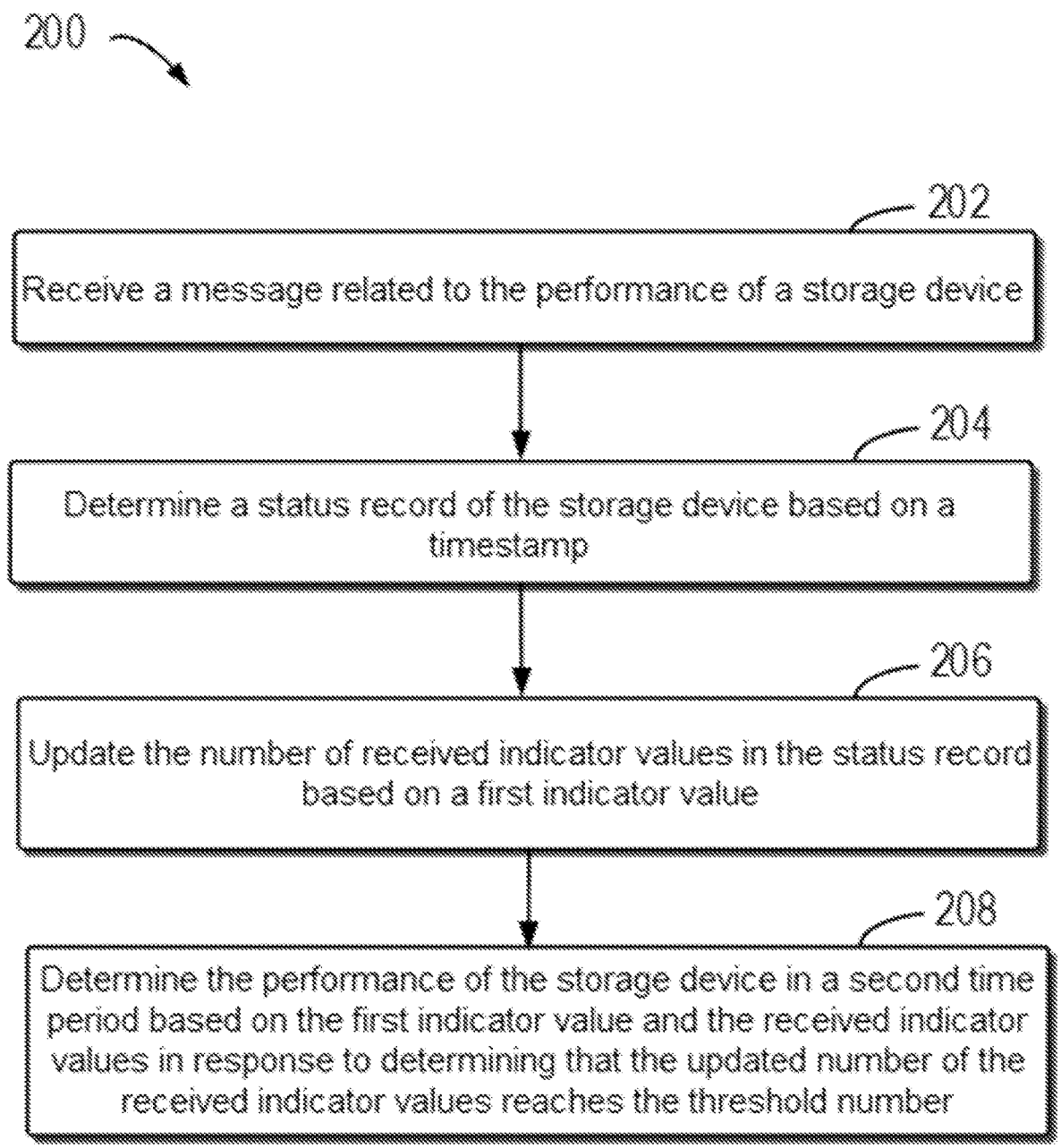
FIG. 2 illustrates a flow chart of method 200 for processing data according to the embodiments of the present disclosure.
Figure 3:
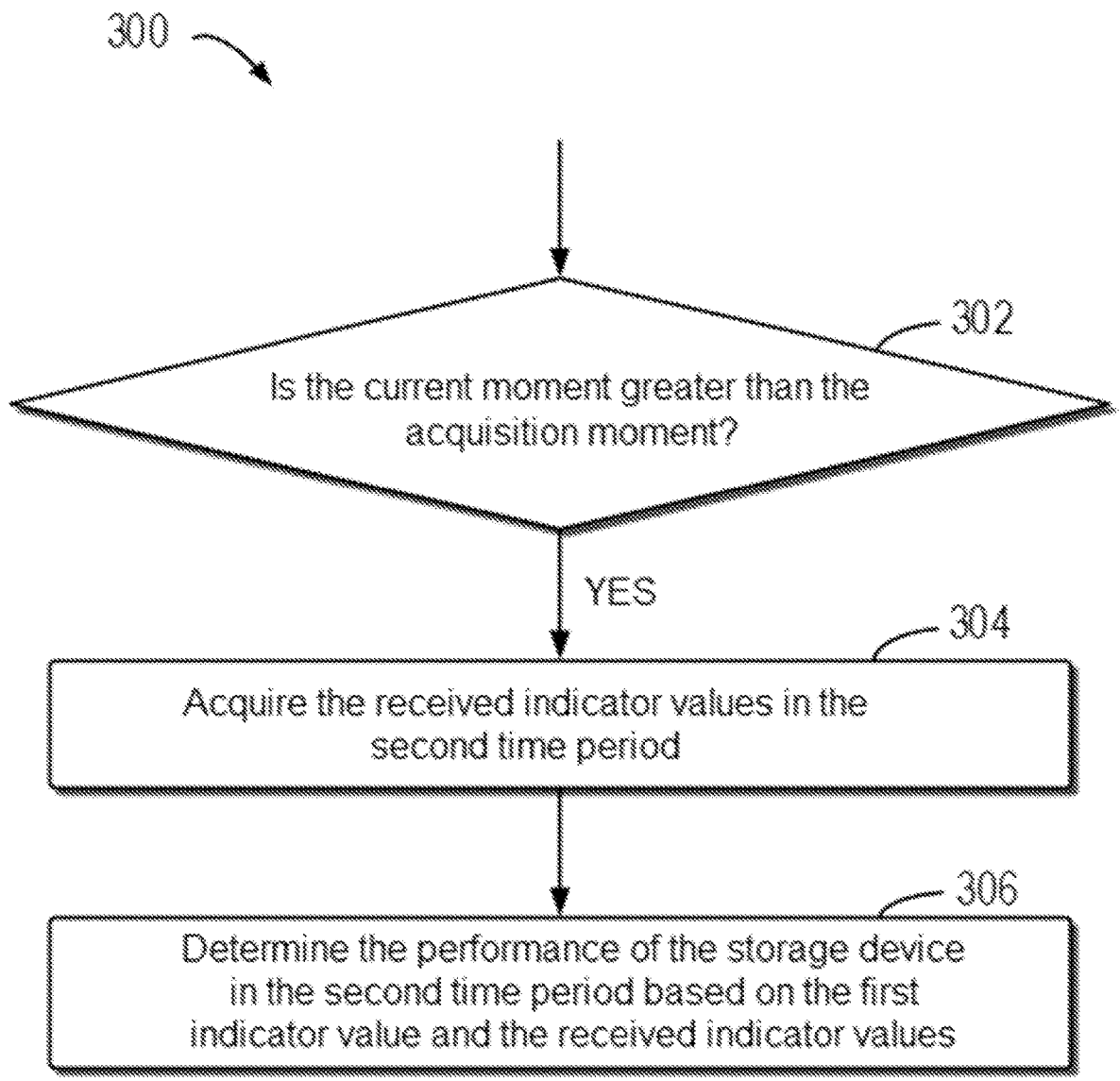
FIG. 3 illustrates a flow chart of method 300 for determining the performance according to the embodiments of the present disclosure.

The above describes method 200 for processing data according to the embodiments of the present disclosure with reference to FIG. 2. The following will describe a method for determining the performance of storage device 102 with reference to FIG. 3. FIG. 3 illustrates a flow chart of method 300 for determining the performance according to the embodiments of the present disclosure. Method 300 in FIG. 3 may be implemented in computing device 106 in FIG. 1 or any other suitable devices.

Computing device 106 may periodically scan status record 108. After the first indicator value is received and status record 108 is updated, the performance record set will include the received indicator values received before receiving the first indicator value and the first indicator value.

At block 302, computing device 106 determines whether the current moment is greater than the acquisition moment of status record 108. When it is determined that the current moment is greater than the acquisition moment in status record 108, computing device 106 acquires the received indicator values in the second period at block 304. In addition, computing device 106 will also obtain the first indicator value.

Computing device 106 may use the identifier of storage device 102 and the first duration to obtain performance records between the start moment and the last moment of the second time period from the performance record set. Then, the received indicator values are obtained from these performance records.

At block 306, computing device 106 determines the performance of storage device 102 in the second time period based on the first indicator value and the received indicator values. The process of using the first indicator value and the received indicator values to determine the performance of storage device 102 in the second time period has been described above, and descriptions thereof will be omitted here.

In some embodiments, if computing device 106 detects that the current moment is greater than the acquisition moment of status record 108 before receiving the first indicator value, it determines the performance of storage device 102 in the second time period according to the previously received indicator values.

Through the foregoing method, it is ensured that even if sufficient indicator values may not be received, the performance of the storage device in the second time period can be quickly (e.g., near real time) determined, so as to provide better experience for the user.

The above describes method 300 for determining the performance of a task according to the embodiments of the present disclosure with reference to FIG. 3. The following will describe a specific example of determining the performance with reference to FIG. 4. FIG. 4 illustrates a schematic diagram of information statistics table 400 according to an embodiment of the present disclosure. The process of determining the performance of storage device 102 by using information statistics table 400 may be performed by computing device 106 or any other suitable devices.

An information record table shown in FIG. 4 includes message receiving moments, timestamps in messages, and indicator value information. Computing device 106 receives messages from storage device 102 at 12 different message receiving moments. The received messages have different timestamps and indicator values. Storage device 102 sends 5-min information. Computing device 106 determines the performance of storage device 102 for 1 h, and the set predetermined duration for waiting for the message is 8 min.

A message including the first indicator value V1 of storage device 102 is received at the moment of 2019-08-21 02:00:00, and it is determined that the second time period is from 2019-08-21 02:00:00 to 2019-08-21 02:55:00. Since the message at this moment is the first message, status record 108 is generated, the number of the received indicator value is 1, and the acquisition moment of the performance of storage device 102 in 1 h is set to be 2019-08-21 02:08:00. Status record 108 is saved in the status record set, while V1 of the received performance is saved in the performance record. A second message including the second indicator value V2 is received at 2019-08-21 02:05:00. At this moment, there is status record 108, the number of the received indicator values in status record 108 is updated to 2, and the acquisition moment is updated to 2019-08-21 02:13:00. At the same time, V2 of the received performance is saved in the performance record.

Due to network issues, computing device 106 no longer receives any message at 2019-08-21 02:13:00. As the acquisition moment is up, computing device 106 calculates the performance of storage device 102 at the second moment based on the acquired V1 and V2. Then, status record 108 is deleted. When computing device 106 receives a message including indicator values V3 and V4 at 2019-08-21 02:15:00, it regenerates status record 108, and sets the number of the received indicator values to be 2 and the acquisition moment to 2019-08-21 02:23:00. At the same time, received V3 and V4 of the performance are saved in the performance record. Since V5, V6, V7, V8, V9, and V10 are received on time later, and the number of the received indicator values does not exceed 12, the status record is always updated. Furthermore, received V5, V6, V7, V8, V9, and V10 of the performance are saved in the performance record. After V10 is received, the number of the received indicator values is 8, and the acquisition moment is updated to 2019-08-21 02:53:00. Since no new indicator value is received at 2019-08-21 02:53:00, at this moment, computing device 106 acquires received indicator values V1 to V10 between 2019-08-21 02:00:00 and 2019-08-21 02:55:00, and then calculates the performance of storage device 102 in the second time period by using V1 to V10. The previously stored performance values are then updated with the calculated performance value, and then status record 208 is deleted. Similarly, when V12 and V11 are received, status records 208 are regenerated respectively. Then, when the acquisition moment expires, the performance of storage device 102 in the second time period is recalculated.

If the performance in the second time period has been used to calculate the performance of storage device 102 in a longer time period, the performance of storage device 102 in the longer time period is updated after the performance of storage device 102 in the second time period is updated.

Figure 5:
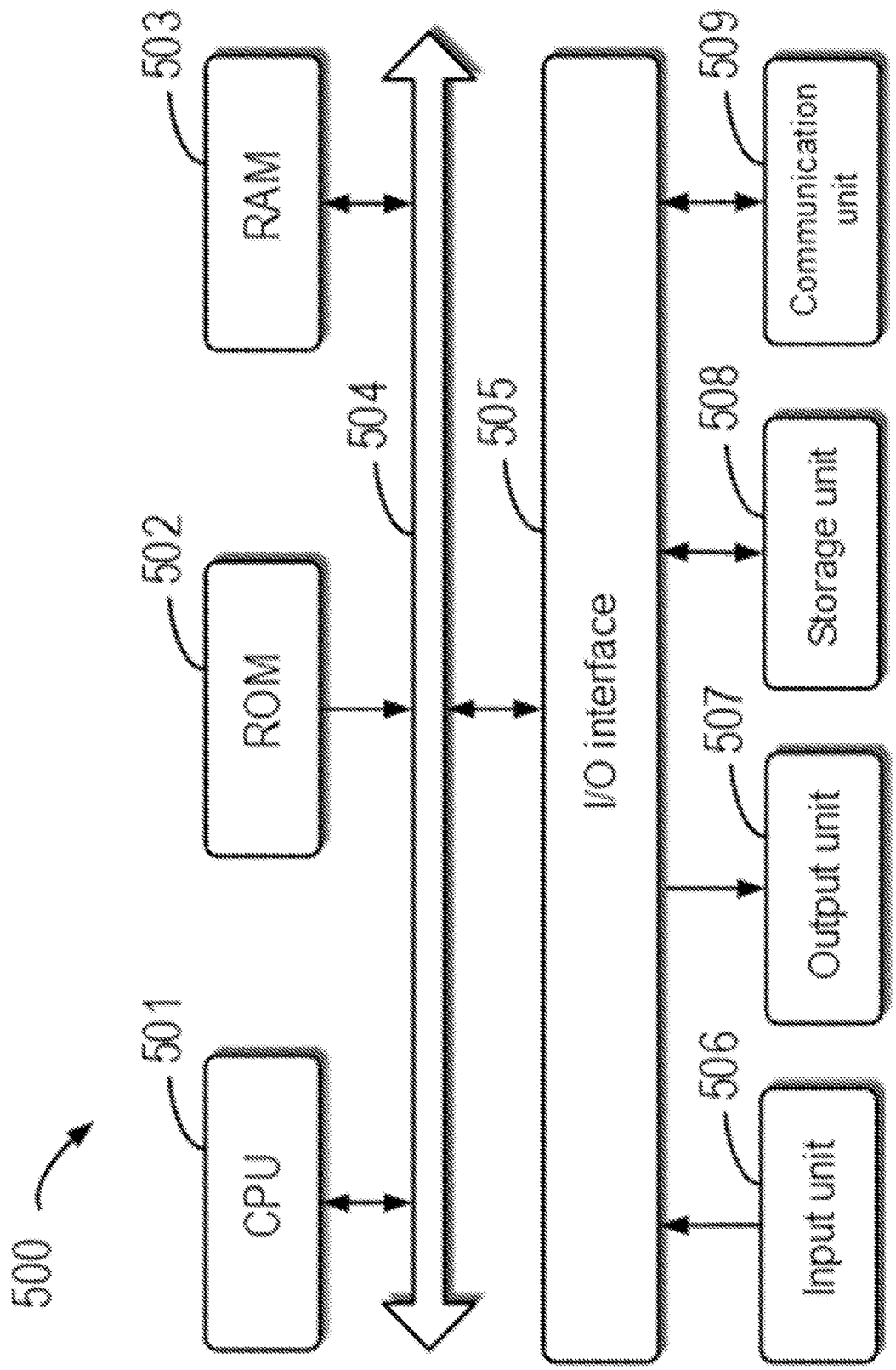
FIG. 5 illustrates a schematic block diagram of example device 500 applicable to implementation of the embodiments the present disclosure.

FIG. 5 illustrates a schematic block diagram of example device 500 that can be used to implement the embodiments of the present disclosure. For example, storage device 102 and computing device 106 as shown in FIG. 1 may be implemented by device 500. As shown in the figure, device 500 includes Central Processing Unit (CPU) 501 which may perform various appropriate actions and processing according to a computer program instruction stored in Read Only Memory (ROM) 502 or a computer program instruction loaded from storage unit 508 into Random Access Memory (RAM) 503. In RAM 503, various programs and data required for the operation of storage device 500 may also be stored. CPU 501, ROM 502, and RAM 503 are connected to each other through bus 504. Input/Output (I/O) interface 505 is also connected to bus 504.

Multiple components in device 500 are connected to I/O interface 505, including: input unit 506, such as a keyboard or a mouse; output unit 507, such as various types of displays or speakers; storage unit 508, such as a magnetic disk or an optical disk; and communication unit 509, such as a network card, a modem, or a wireless communication transceiver. Communication unit 509 allows device 500 to exchange information/data with other devices over a computer network such as the Internet and/or various telecommunication networks.

The various methods and processes described above, such as method 200 and method 300, may be performed by processing unit 501. For example, in some embodiments, method 200 and method 300 may be implemented as a computer software program that is tangibly included in a machine-readable medium, such as storage unit 508. In some embodiments, some or all of the computer programs may be loaded and/or installed onto device 500 via ROM 502 and/or communication unit 509. When the computer programs are loaded to RAM 503 and executed by CPU 501, one or more actions in method 200 and method 300 described above can be executed.

The embodiments of the present disclosure relate to a method, an apparatus, a system, and/or a computer program product. The embodiments of the present disclosure may include a computer-readable storage medium having computer-readable program instructions for performing various aspects of the present disclosure.

The computer-readable storage medium may be a tangible device that can hold and store instructions used by an instruction execution device. For example, the computer-readable storage medium may be, but is not limited to, an electrical storage device, a magnetic storage device, an optical storage device, an electromagnetic storage device, a semiconductor storage device, or any suitable combination of the foregoing. More specific examples (a non-exhaustive list) of the computer-readable storage medium include: a portable computer disk, a hard disk, an RAM, an ROM, an erasable programmable read only memory (EPROM) or a flash memory, a static random access memory (SRAM), a portable compact disk read only memory (CD-ROM), a digital versatile disk (DVD), a memory stick, a floppy disk, a mechanically encoding device such as punch-cards or raised structures in a groove having instructions recorded thereon, and any suitable combination of the foregoing. The computer-readable storage medium as used herein is not to be interpreted as a transient signal itself, such as a radio wave or other freely propagating electromagnetic waves, an electromagnetic wave propagating through a waveguide or other transmission media, e.g., a light pulse through a fiber optic cable, or an electrical signal transmitted through an electrical wire.

The computer-readable program instructions described herein may be downloaded from the computer-readable storage medium to various computing/processing devices or downloaded to an external computer or an external storage device over a network, such as the Internet, a local area network (LAN), a wide area network (WAN), and/or a wireless network. The network may include copper transmission cables, fiber optic transmissions, wireless transmissions, routers, firewalls, switches, gateway computers, and/or edge servers. A network adapter card or network interface in each computing/processing device receives a computer-readable program instruction from the network and forwards the computer-readable program instruction for storage in the computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages, such as Java, Smalltalk, and C++, as well as conventional procedural programming languages, such as "C" language or similar programming languages. The computer-readable program instructions may be executed entirely on a user computer, executed partly on a user computer, executed as a stand-alone software package, executed partly on a user computer while executed partly on a remote computer, or executed entirely on a remote computer or a server. In case of a remote computer being involved, the remote computer may be connected to a user computer through any type of network, including an LAN or a WAN, or may be connected to an external computer, e.g., connected through the Internet using an Internet service provider. In some embodiments, an electronic circuit, such as a programmable logic circuit, a field programmable gate array (FPGA), or a programmable logic array (PLA), may be customized by utilizing status information of the computer-readable program instructions. The electronic circuit may execute the computer-readable program instructions to implement various aspects of the present disclosure.

Various aspects of the present disclosure are described herein with reference to flow charts and/or block diagrams of methods, apparatuses/systems, and computer program products according to embodiments of the present disclosure. It should be understood that each block of the flow charts and/or block diagrams and a combination of blocks in the flow charts and/or block diagrams can be implemented by the computer-readable program instructions.

These computer-readable program instructions can be provided to a processing unit of a general-purpose computer, a special-purpose computer, or other programmable data processing apparatuses, thereby producing a machine that causes these instructions to, when executed by the processing unit of the computer or other programmable data processing apparatuses, generate an apparatus that implements the functions/actions specified in one or more blocks in the flow charts and/or block diagrams. The computer-readable program instructions may also be stored in a computer-readable storage medium. These instructions enable a computer, a programmable data processing apparatus, and/or other devices to work in a specific manner. Therefore, the computer-readable medium storing the instructions includes a manufactured article that includes instructions for implementing the functions/actions specified in one or more blocks in the flow charts and/or block diagrams.

The computer-readable program instructions may also be loaded onto a computer, other programmable data processing apparatuses, or other devices, so that a series of operating steps are performed on the computer, other programmable data processing apparatuses, or other devices to produce a computer-implementing process, and the instructions executed on the computer, other programmable data processing apparatuses, or other devices implement the functions/actions specified in one or more blocks in the flow charts and/or block diagrams.

The flow charts and the block diagrams in the drawings illustrate architectures, functions, and operations of possible implementations of the systems, the methods, and the computer program products according to various embodiments of the present disclosure. In this regard, each block in the flow charts or the block diagrams may represent a part of a module, a program segment, or an instruction, and the part of the module, the program segment, or the instruction includes one or more executable instructions for realizing specified logic functions. In some alternative implementations, the functions marked in the blocks may also occur in an order different from that marked in the accompanying drawings. For example, two continuous blocks may actually be executed basically concurrently and may also be executed according to a reverse order sometimes, which is decided by the involved functions. It should also be noted that each block in the block diagrams and/or the flow charts as well as a combination of the blocks in the block diagrams and/or the flow charts may be realized by using a dedicated hardware-based system for executing specified functions or actions, or may be realized by using a combination of dedicated hardware and a computer instruction.

The various embodiments of the present disclosure have been described above. The foregoing description is exemplary, not exhaustive, and is not intended to be limited to the disclosed embodiments. Multiple modifications and variations will be apparent to those skilled in the art without departing from the scope and spirit of the illustrated embodiments. The terms used herein were chosen to best explain the principles of the various embodiments, practical applications, or improvements on technologies in the marketplace, or to enable others of ordinary skill in the art to understand the various embodiments disclosed herein.

What is claimed is:

1. A method, comprising:
   determining, by a system comprising a processor, a status record of a storage device based on reception of an indicator value regarding a performance of the storage device in a first time period having a first duration and associated with a timestamp, comprising:
      monitoring for receptions of indicator values associated with additional first time periods other than the first time period, wherein a second time period having a second duration comprises all of the first time periods;
   in response to determining that a count of the receptions of the indicator values associated with all of the first time periods has reached at least a threshold count, determining, by the system, the performance of the storage device in the second time period based on the indicator values associated with all of the first time periods.

2. The method of claim 1, wherein determining the status record comprises:
   acquiring, by the system, an identifier and a type of the storage device;
   determining, by the system, the first duration of the first time period based on the type; and
   determining, by the system, a start moment of the second time period and an end moment of the second time period based on the timestamp.

3. The method of claim 2, further comprising:
   determining, by the system, an acquisition moment configured to acquire the performance of the storage device in the second time period; and
   generating, by the system, the status record based on the acquisition moment, the identifier, the first duration, the start moment, and the end moment.

4. The method of claim 1, wherein determining the status record comprises:
   in response to determining that there is a previous status record comprising an identifier of the storage device, the first duration of the first time period, a start moment of the second time period, an end moment of the second time period, and an acquisition moment configured to acquire the performance of the storage device in the second time period, employing, by the system, the previous status record in determining the status record.

5. The method of claim 1, wherein the performance of the storage device in the second time period is determined based on at least one of:
   an average value of the indicator values;
   a first indicator value among the indicator values, which is greater than a first threshold value; or
   a second indicator value among the indicator values, which is less than a second threshold value, wherein the second threshold value is less than the first threshold value.

6. The method of claim 1, further comprising:
   in response to determining that the count of receptions of the indicator values associated with all of the first time periods has not reached at least the threshold count and that a current moment is greater than an acquisition moment in the status record, which is configured to acquire the performance of the storage device in the second time period, determining, by the system, the performance of the storage device in the second time period based on the indicator values associated with all of the first time periods.

7. The method of claim 1, further comprising:
   updating, by the system, an acquisition moment in the status record, which is configured to acquire the performance of the storage device in the second time period, based on a moment at which a first indicator value of the indicator values is received and a duration representing a time interval after the first indicator value is received.

8. A device, comprising:
   a processor; and
   a memory that stores executable instructions that, when executed by the processor, facilitate performance of operations, comprising:
      determining a status record of a storage device based on reception of an indicator value regarding a performance of the storage device in a first time period having a first duration and associated with a timestamp, comprising:
         monitoring for receptions of indicator values associated with additional first time periods other than the first time period, wherein a second time period having a second duration comprises all of the first time periods;
      in response to determining that a count of the receptions of the indicator values associated with all of the first time periods has reached at least a threshold count, determining the performance of the storage device in the second time period based on the indicator values associated with all of the first time periods.

9. The device of claim 8, wherein determining the status record comprises:
   acquiring an identifier and type of the storage device;
   determining the first duration of the first time period based on the type; and
   determining a start moment and an end moment of the second time period based on the timestamp.

10. The device according to claim 9, wherein the operations further comprise:
    determining an acquisition moment configured to acquire the performance of the storage device in the second time period; and
    generating the status record based on the acquisition moment, the identifier, the first duration, the start moment, and the end moment.

11. The device of claim 8, wherein determining the status record comprises:
    in response to determining that there is a previous status record comprising an identifier of the storage device, the first duration of the first time period, a start moment of the second time period, an end moment of the second time period, and an acquisition moment configured to acquire the performance of the storage device in the second time period, employing the previous status record in determining the status record.

12. The device of claim 8, wherein the performance of the storage device in the second time period is determined based on at least one of:
    an average value of the indicator values;
    a first indicator value among the indicator values, which is greater than a first threshold value; or
    a second indicator value among the indicator value and the indicator values, which is less than a second threshold value, wherein the second threshold value is less than the first threshold value.

13. The device of claim 8, wherein the operations further comprise:
   in response to determining that the count of receptions of the indicator values associated with all of the first time periods has not reached at least the threshold count and that a current moment is greater than an acquisition moment in the status record, which is configured to acquire the performance of the storage device in the second time period, determining the performance of the storage device in the second time period based on the indicator values associated with all of the first time periods.

14. The device of claim 8, wherein the operations further comprise:
   updating an acquisition moment in the status record, which is configured to acquire the performance of the storage device in the second time period, based on a moment at which a first received indicator value of the indicator values is received and a defined duration representing a time interval after the first indicator value is received.

15. A non-transitory machine-readable medium, comprising executable instructions that, when executed by a processor, facilitate performance of operations, comprising:
   determining a status record of a storage device based on reception of an indicator value regarding a performance of the storage device in a first time period having a first duration and associated with a timestamp, comprising:
      monitoring for receptions of indicator values associated with additional first time periods other than the first time period, wherein a second time period having a second duration comprises all of the first time periods;
   in response to determining that count of the receptions of the indicator values associated with all of the first time periods has satisfied a function with respect to a threshold count, determining the performance of the storage device in the second time period based on the indicator values associated with all of the first time periods.

16. The non-transitory machine-readable medium of claim 15, wherein determining the status record comprises:
   acquiring an identifier and type of the storage device;
   determining the first duration of the first time period based on the type; and
   determining a start moment and an end moment of the second time period based on the timestamp.

17. The non-transitory machine-readable medium of claim 16, wherein the operations further comprise:
   determining an acquisition moment configured to acquire the performance of the storage device in the second time period; and
   generating the status record based on the acquisition moment, the identifier, the first duration, the start moment, and the end moment.

18. The non-transitory machine-readable medium of claim 15, wherein determining the status record comprises:
   in response to determining that there is a previous status record comprising an identifier of the storage device, the first duration of the first time period, a start moment of the second time period, an end moment of the second time period, and an acquisition moment configured to acquire the performance of the storage device in the second time period, employing the previous status record in determining the status record.

19. The non-transitory machine-readable medium of claim 15, wherein the performance of the storage device in the second time period is determined based on at least one of:
   an average value of the indicator values;
   a first indicator value among the indicator values, which is greater than a first threshold value; or
   a second indicator value among the indicator values, which is less than a second threshold value, wherein the second threshold value is less than the first threshold value.

20. The non-transitory machine-readable medium of claim 15, wherein the operations further comprise:
   in response to determining that the count of receptions of the indicator values associated with all of the first time periods has not satisfied the function with respect to the threshold count and that a current moment is greater than an acquisition moment in the status record, which is configured to acquire the performance of the storage device in the second time period, determining the performance of the storage device in the second time period based on the indicator values.

\* \* \* \* \*